United States Patent [19]

Borgen et al.

[11] 4,064,895
[45] Dec. 27, 1977

[54] NON-SIPHONING FLOAT CONTROLLED VALVE ASSEMBLY

[75] Inventors: Arden L. Borgen; Cleon C. Merrill, both of Webster City, Iowa

[73] Assignee: Arrow-Acme Corporation, Webster City, Iowa

[21] Appl. No.: 713,848

[22] Filed: Aug. 12, 1976

[51] Int. Cl.² .................... G05D 9/02; F16K 31/18; F16K 24/02
[52] U.S. Cl. ........................... 137/216; 119/78; 137/448
[58] Field of Search .................. 119/78, 79, 80; 137/216, 434, 448

[56] References Cited

U.S. PATENT DOCUMENTS

| | | | |
|---|---|---|---|
| 2,778,377 | 1/1957 | Manchester | 137/448 |
| 2,854,022 | 9/1958 | Mosher | 137/448 X |
| 3,286,724 | 11/1966 | Sawyer | 137/434 X |
| 3,485,261 | 12/1969 | Reitman | 137/216 |
| 3,970,101 | 7/1976 | Wilson | 137/216 |

Primary Examiner—Robert G. Nilson
Attorney, Agent, or Firm—James E. Nilles

[57] ABSTRACT

A non-siphoning float controlled valve assembly for supplying water from a source to a livestock watering tank comprises a one-piece cast aluminum hollow housing open at the bottom and having an integrally formed upwardly projecting hollow neck near one end. Means are provided for detachably connecting the housing to the side of the watering tank. The neck serves as a water-fill passage and the main portion of the housing defines a float chamber. The upper end of the neck is adapted for connection to a water supply hose or pipe, and a water-fill inlet opening having a valve seat therearound is provided in a constricted portion of the neck. A pair of anti-siphon holes extend through the neck wall. A downwardly depending float support lever, which has its upper end pivotally connected inside the neck and has its lower end connected to a float in the float chamber, carries a compressible member for cooperation with the valve seat to open and close the water-fill inlet opening as the water level in the tank changes.

10 Claims, 7 Drawing Figures

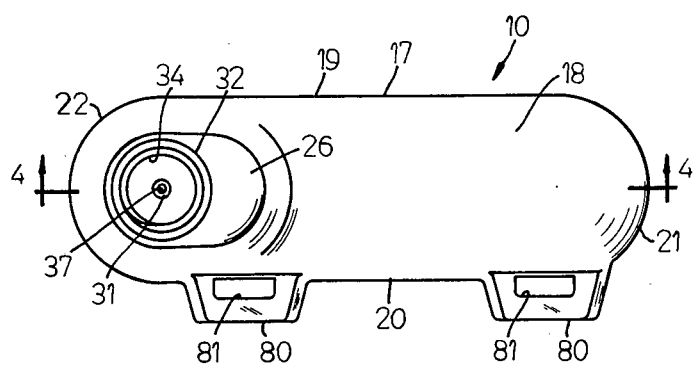
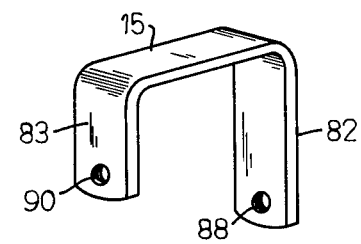
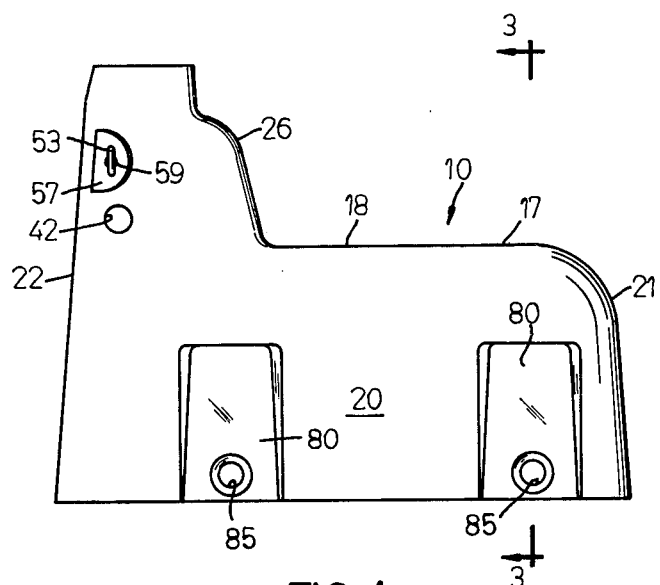
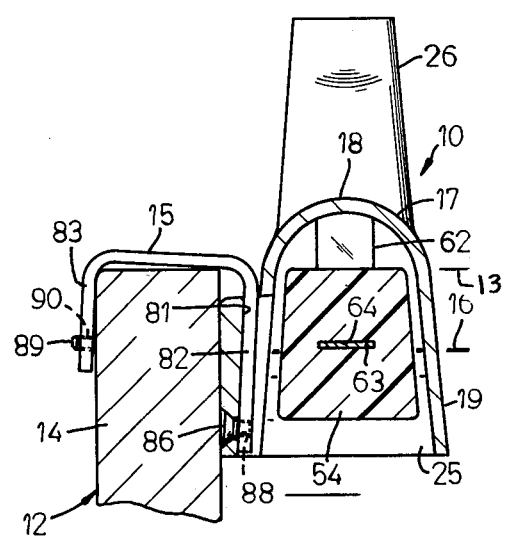
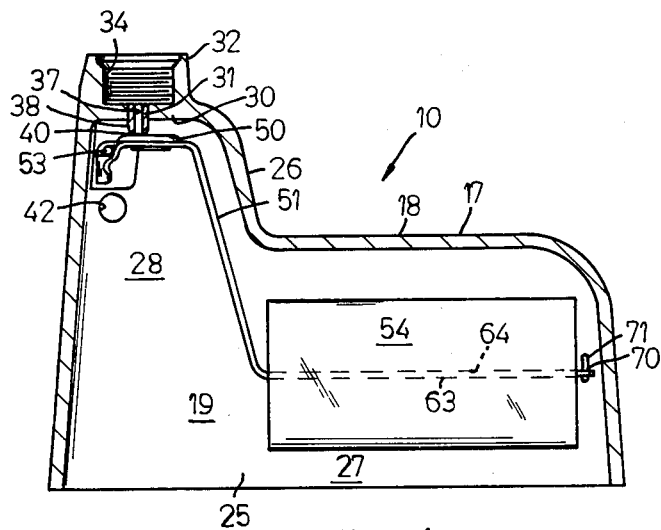

NON-SIPHONING FLOAT CONTROLLED VALVE ASSEMBLY

BACKGROUND OF THE INVENTION

1. Field of Use

This invention relates generally to a non-siphoning float controlled valve assembly for regulating the water level in a livestock watering tank or the like.

2. Description of the Prior Art

Float control valve assemblies of the aforesaid character are known in the prior art, and U.S. Pat. Nos. 3,270,770; 3,286,724; 3,766,939; and 3,485,261 illustrate the state of the art. U.S. Pat. No. 3,485,261 discloses a float control valve for a stock watering tank which includes a sheet metal housing having an upwardly extending tubular member connected thereto by welding which defines a water-fill passage. The tubular member is provided at its upper end with a threaded hose connection or coupling which is secured thereto by a circumferential indentation in the tubular member. The coupling has a centrally located water fill inlet opening therethrough which is opened and closed by a plunger on a rod which extends downwardly through the tubular member and is pivotally connected at its lower end by a first pin to a lever arm which, in turn, is pivotally attached at one end by a second pin to a bracket welded to the housing. The other end of the lever arm is rigidly and permanently secured to a float by an adhesive. The tubular member has a plurality of anti-siphon apertures or slots punched in the wall thereof to prevent any siphoning back flow into the supply line from the tank in the case of failure of water supply pressure.

SUMMARY OF THE INVENTION

There is disclosed a float controlled valve assembly for supplying water from a source to a livestock watering tank, for regulating the water level in the tank to maintain it at a fill level, and for preventing back-siphoning of water in the tank into the source. The valve assembly comprises a one-piece cast aluminum hollow housing open at the bottom and having an integrally formed upwardly projecting hollow neck near one end. The neck serves as a water-fill passage through which water from the source is supplied to the tank and the main portion of the housing defines a float chamber into which water may rise. The upper end of the neck is adapted for connection to a hose or pipe from the water supply, and a water-fill inlet opening of relatively small diameter is provided in a constricted portion of the upper end of the neck. A valve seat surrounds the water-fill inlet opening in the water-fill passage. A pair of anti-siphon holes extend through the neck wall below the water-fill inlet opening and above the flood level of the housing, i.e., a level above the fill level of the tank. A downwardly depending float support lever has its upper end pivotally connected to the neck inside the water-fill passage by a pivot pin and has its lower end connected to a float in the float chamber. The float support lever carries a compressible member near its upper end for cooperation with the valve seat around the water-fill inlet opening. When the water level in the tank is below the fill level, the float enables the lever to descend thereby unseating the compressible member and enabling water to enter the tank through the water-fill inlet opening. When the water level in the tank reaches the fill level, the float causes the lever to move upward thereby seating the compressible member against the valve seat and shutting off water throuth the water-fill inlet opening. Means are provided for detachably connecting the valve assembly housing to the side of a watering tank.

A valve assembly in accordance with the present invention has several advantages over similar prior art assemblies. For example, the valve assembly comprises a one-piece cast aluminum housing with the upwardly projecting hollow extension integrally formed therewith. Also, since the upward extension is integral with the housing, the possibility of the upward extension being broken off from the housing is eliminated. This is a relatively more economical arrangement since it eliminates the necessity to fabricate and attach together a plurality of subcomponents. Furthermore, use of aluminum results in a relatively non-corrosive housing as compared to housing fabricated of galvanized or plated sheet metal or the like. Furthermore, a valve assembly in accordance with the invention isconstructed so that the pivotal connections for relatively movable components are located above the fill level of the tank and are not exposed to corrosion and contamination from constant submersion. Furthermore, the linkage being disposed above the fill level reduces the possibility of floating debris from jamming the operating mechanism. In addition, a control valve assembly in accordance with the invention has a relatively simpler operating linkage which is not subjected to jamming or breakage as is the case in some prior art devices. Finally, applicant's control valve assembly employs a minimum number of parts, a minimum number of fabrication steps and completely eliminates the need to weld or solder various components together. Other objects and advantages of the invention will hereinafter appear.

BRIEF DESCRIPTION OF THE DRAWINGS

FIG. 1 is a side elevational view of a non-siphoning float control valve assembly in accordance with the invention;

FIG. 2 is a top plan view of the assembly shown in FIG. 1;

FIG. 3 is a cross-sectional view of the assembly taken on line 3—3 of FIG. 1 and showing the assembly attached to the edge of a livestock watering tank;

FIG. 4 is a cross-sectional view of the assembly taken on line 4—4 of FIG. 2;

FIG. 5 is a perspective view of the U-shaped attachment bracket shown in FIG. 3;

DESCRIPTION OF A PREFERRED EMBODIMENT

Figure 6:
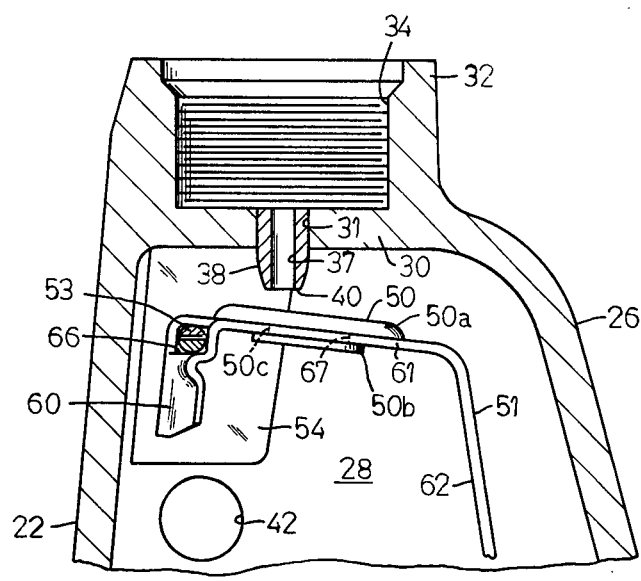
FIG. 6 is an enlarged, cross-sectional view of the water-fill inlet portion of the assembly shown in FIG. 4 and shows the water-fill inlet in open condition.

Referring to FIGS. 1 through 4, there is shown a float controlled valve assembly 10 in accordance with the invention for supplying water from a source (not shown) to a livestock watering tank 12, for regulating the water level in the tank to maintain it at a fill level 16, and for preventing back-siphoning of water in the tank into the source in the event of loss of water supply pressure. FIG. 3 shows valve assembly 10 secured or mounted on the side edge 14 of tank 12 by means of a pair of U-shaped brackets 15 (only one of which is shown) in such a position so as to fill tank 12 from the water source and to maintain the water in tank 12 at a fill level designated 16. However, in some circumstances water in tank 12 can rise to a flood level 13 which is even with the upper edge of the tank wall 14, as during rain. When the water level is below fill level 16, valve assembly 10 operates to permit water to flow from the source into tank 12. When the water in tank 12 rises to fill level 16, valve assembly 10 stops the flow of water from the source.

Assembly 10 comprises a one-piece cast aluminum housing 17, open at its bottom, having a top wall 18, downwardly depending side walls 19 and 20, and downwardly depending end walls 21 and 22 and is open at the bottom as at 25. Housing 17 is provided near one end with an integrally formed upwardly projecting hollow extension or neck 26. Housing 17 defines a float chamber 27 and neck 26 defines a water-fill passage 28. The water-fill passage 28 serves as a means through which water from the source is supplied to the tank 12 and the main portion of the housing 17 defines a float chamber 27 into which water may rise.

The upper end of the neck 26 is adapted for screw connection to a hose or pipe (not shown) from the water supply, and a water-fill inlet opening 37 of relatively small diameter is provided in a member 38 in a hole 31 in a constricted portion or wall 30 in the upper end of the neck.

More specifically, neck 26 comprises integrally formed upper wall 30 having centrally located hole 31 therethrough. A circular flange 32, which is integral with and extends upwardly from upper wall 30, has an inwardly extending threaded opening 34 for receiving the threaded end of the hose or pipe (not shown) which is understood to be connected to a water supply (not shown). Threaded opening 34 communicates with water-fill passage 28 through a water inlet opening 37 in brass cylindrical valve seat member 38 which is secured as by press-fitting in opening 31 in end wall 30. The inner end of valve seat member 38 extends below wall 30 and is tapered to define a valve seat 40 around the water-fill opening 37.

Neck 26 is provided with a pair of anti-siphon holes 42 which extend through the neck wall on opposite sides thereof. Each anti-siphon hole 42 is located below water inlet opening 37 and above the flood level 13 when assembly 10 is mounted on tank 12. Preferably, the center of each anti-siphon hole 42 is at least one inch above flood level 13 when the valve assembly 10 is mounted on tank 12. The anti-siphon holes 42 prevent water from tank 12 from siphoning upward through water-fill passage 28 and through water-inlet opening 37 and back into the water supply system thereby contaminating the latter in the event there is a loss of pressure or a reversal of water flow in the water supply system.

Means are provided to conrol opening and closing of water inlet opening 37. Such means comprise a downwardly depending float support lever 51 which has its upper end pivotally connected to the neck 26 inside the water-fill passage 28 by a pivot pin 53 and has its lower end connected to a float 54 in the float chamber 27. The float support lever 51 carries a compressible member 50 near its upper end for cooperation with the valve seat 40 around the water-fill inlet opening 37. Compressible member 50 is fabricated, for example, of neoprene rubber or the like and comprises a cylindrical upper portion 50a which is joined to a cylindrical lower portion 50b by a cylindrical intermediate portion 50c of reduced diameter. Compressible member 50 cooperates with valve seat 40 to effect opening of water-inlet opening 37 when lever 51 moves downward (as shown in FIG. 6) when the water level in tank 12 descends and to effect closure of water inlet opening 37 when lever 51 is moved upward to the position shown in FIG. 4 by float 54. Float support lever 51 has its upper end pivotally connected to the inside wall of extension 26 by means of a pivot pin 53, in the form of a stainless steel cotter pin, and has its lower end connected to a float 54 which is disposed in float chamber 27.

Figure 7:
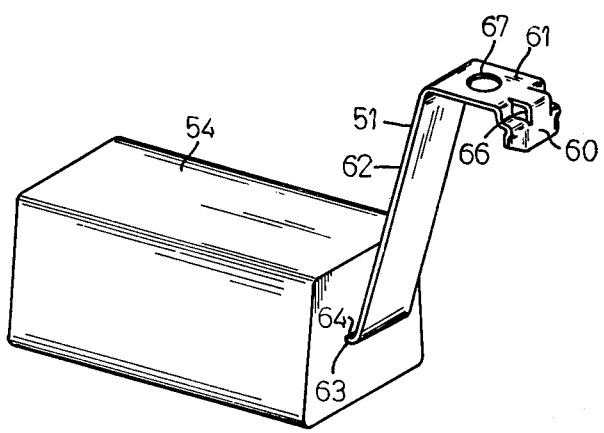
FIG. 7 is a perspective view of the float support member and its attached float shown in FIG. 4.

As FIGS. 4, 6, and 7 show, float support lever 51 is fabricated as by stamping from a rigid flat strip of sheet metal and has a downwardly projecting section 60, an integrally formed intermediate section 61, a downwardly sloped section 62, and a relatively long lower end section 63 which extends through a slot 64 formed in float 54. The bent portion of lever 51 between the adjoining sections 60 and 61 is slit and upset so as to provide a pin-receiving hole 66 for accomodating pivot pin 53. The intermediate section 61 of lever 51 is provided with an opening 67 for accomodating the intermediate portion 50c of compressible member 50 which is snap-fitted therein. The extreme end of lower section 63 of lever 51 is provided with an opening 70 for accomodating a float retaining pin 71, in the form of a stainless steel cotter pin, which ensures that the float 54 cannot be inadvertently removed from the lever arm.

As FIGS. 1, 4 and 6 show, neck 26 of housing 17 is fabricated or cast so as to have a pair of inwardly extending bosses, such as 54, formed on opposite inner side walls of neck 26, as shown in FIGS. 4 and 6. The bosses 54 have corresponding indentations 57 on the exterior of neck 26 as FIG. 1 shows. The bosses 54 are provided with pin-receiving openings 59 for receiving pivot pin 53 which pivotally supports lever 51. The bosses 54 are spaced apart from each other a distance which is slightly greater than the width of the sections 60 and 61 of lever 51, thereby preventing any substantial sideward shifting movement of lever 51 on pivot pin 53 and thereby ensuring that compressible member 50 will always properly register with valve seat 40. The indentations or recesses 57 on the exterior of neck portion 26 serve to protect the outwardly projecting ends of pivot pin 53 from damage.

Referring to FIGS. 1, 2, and 3, it is seen that side 20 of housing 17 is provided with a pair of outwardly projecting, integrally formed bosses 80. Each boss 80 has a slot 81 in its upper end for accomodating the relatively long downwardly depending leg 82 of mounting bracket 15. As FIG. 1 shows, each boss 80 is also provided with a countersunk hole 85 near the lower end thereof for accomodating a flathead screw 86 which is used to secure the bracket 15 to housing 17. The screw 86 threadedly engages the hole 88 in leg 82 in bracket 15. Another flathead screw 89 threadedly engages a countersunk hole 90 in leg 83 in bracket 15 and secures the bracket 15 and the attached housing 17 to the wall 14 of tank 12, as shown in FIG. 3.

The control valve assembly 10 is manufactured and assembled as follows. Housing 17 is fabricated as a one-piece aluminum casting. The brass cylindrical valve seat member 38 is press-fitted into opening 31 in end wall 30. The float support lever 51 is fabricated as a single sheet metal stamping. Prior to mounting of lever 51 within housing 17, the compressible member 50 is snap-fitted into hole 67 and the styrofoam float 54, which is fabricated from molded styrofoam which has been cut to size and provided with a slot 64, is slid onto lever 51. The float retaining pin 71 is inserted through hole 70 and the legs of the cotter pin are bent to retain it in position. The lever 51 with the compression member 50 and the float 54 attached is inserted within housing 17 and the cotter pin 53 is inserted through the holes 59 in neck 26 and through the hole 66 in lever 51. For field assembly and installation on tank 12, the brackets 15 are attached to housing 17 by inserting the leg 82 of each bracket 15 through the slot 81 in a boss 80, whereupon the screw 86 is inserted to rigidly secure the bracket to the housing. The assembly 10 is then placed on tank 12 so that housing 17 is on the inside of the tank wall and so that the brackets 15 engage the upper edge of the tank wall 14, whereupon the screws 89 are inserted.

Assuming that the valve assembly 10 is mounted on tank 12, as shown in FIG. 3, and further assuming that the assembly is connected to a suitable source of water supply, operation is as follows. When the water in tank 12 is below fill level 16, the lever 51 tends to pivot downwardly (as shown in FIG. 6) due to the weight of lever 51 and the components attached thereto. Lever 51 pivots downwardly only to the extent permitted by the buoyant action of float 54 with respect to the water level in tank 12. As FIG. 6 makes clear, water is able to enter through openings 34 and 37, flow through fill passage 28 and into tank 12. As the water rises to a level wherein it reaches float 54 and buoyancy occurs, the lever 51 will tend to pivot counterclockwise (with respect to FIGS. 4 and 6) and the compressible member 50 will finally engage valve seat 40 to effectively close passage 37 and prevent any water from flowing through passage 38 as shown in FIG. 4. The openings 42 communicate with atmosphere on the exterior side of projection 26 and as a result, it is not possible for a column of water to form in fill passage 28 which could be back-siphoned through openings 38 and 34.

As is apparent from the foregoing description, the valve assembly 10 offers numerous advantages over prior art devices. All component parts of the valve assembly are fabricated of a minimum number of non-corrosive components thereby providing a device having a relatively long life. Further, since the neck 26 is integral with housing 17, no manufacturing operations or materials are required to connect these two component portions, and the neck 26 cannot be broken off from the housing 17. The pivot pin 59 for lever 51 is disposed above the fill level 16 of the water in the tank and, therefore, the pivot pin is not continually submerged in standing water and which debris and other foreign, possibly corrosive, substances are submerged or suspended. Therefore, the pivot connection is not subject to damage or interference and in fact is flushed or washed clean each time water enters the tank through water inlet opening 37. As hereinbefore noted, outwardly extending ends of pin 59 are shielded against damage by the recesses 57 and furthermore, do not project in such a manner as to cause possible injury to livestock using the tank 12. In summary, valve assembly 10 in accordance with the invention is relatively economical to fabricate, easy to assemble and install, and is fool-proof in operation since it has a minimum number of moving parts and a relatively simple pivot linkage.

We claim:

1. A non-siphoning float controlled valve assembly for attachment to a tank to control the supply of liquid from a source to the tank, to regulate the level of the liquid in the tank, and to prevent back-siphoning of liquid from the tank into the liquid supply source comprising:
   a one-piece hollow housing having an integrally formed upwardly extending hollow neck near one end thereof, said housing being open at the bottom and defining a float chamber and said neck defining a fill passage and having an upper end;
   a liquid fill inlet opening near said upper end of said neck for communicating between said liquid supply source and said fill passage;
   a valve seat surrounding said liquid fill inlet opening;
   at least one anti-siphon hole extending through said neck below said liquid fill inlet opening;
   a float support lever having an upper end and a lower end and extending between said fill passage and said float chamber;
   means for pivotally connecting said upper end of said lever to said neck in said fill passage, said means for pivotally connecting said upper end of said lever to said neck comprising at least one pivot pin hole extending through said neck, at least one pivot pin hole through said lever near said upper end thereof, and a pin extending through both said pivot pin holes;
   a float disposed in said float chamber and connected to said lower end of said float lever; and
   a resilient member connected to said support lever for cooperation with said valve seat to open and close said liquid fill inlet opening in response to pivotal movement of said float support lever and said float.

2. An assembly according to claim 1 including an upper wall integral with said neck and extending across said fill passage and wherein said liquid fill inlet opening extends through said upper wall.

3. An assembly according to claim 2 including threaded connection means integral with said neck and disposed above said upper wall for connecting said assembly to said supply of liquid.

4. An assembly according to claim 1 wherein said float comprises an opening extending therethrough for accommodating said lower end of said lever, and wherein said lower end of said lever comprises a pin receiving hole, and including a pin through said hole for maintaining said float on said lever.

5. An assembly according to claim 1 wherein said lever is provided with an opening in which said resilient member is secured.

6. A non-siphoning float controlled valve assembly for attachment to a tank to control the supply of liquid from a source to the tank, to regulate the level of the liquid in the tank, and to prevent back-siphoning of liquid from the tank into the liquid supply source comprising:
   a one-piece hollow housing having an integrally formed upwardly extending hollow neck near one end thereof, said housing being open at the bottom and defining a float chamber and said neck defining a fill passage;
   an upper wall integral with said neck and extending across said fill passage, said upper wall having an opening extending therethrough;
   threaded connection means integral with said neck and disposed above said upper wall for connecting said assembly to said supply of liquid;
   a hollow member extending through said opening and having a liquid fill inlet opening therethrough for communicating between said liquid supply source and said fill passage;

a valve seat at the lower end of said hollow member and surrounding said liquid fill inlet opening;

at least one anti-siphon hole extending through said neck below said liquid fill inlet opening;

a float support lever having an upper end and a lower end and extending between said fill passage and said float chamber;

means for pivotally connecting said upper end of said lever to said neck in said fill passage, said means for pivotally connecting the upper end of said lever to said neck comprising at least one pivot pin hole extending through said neck, at least one pivot pin hole through said lever near said upper end thereof, and a pin extending through both said pivot pin holes;

a float disposed in said float chamber and connected to said lower end of said float lever; and a resilient member connected to said support lever for cooperating with said valve seat to open and close said liquid fill inlet opening in response to pivotal movement of said float support lever and said float.

7. An assembly according to claim 6 wherein said float comprises an opening extending therethrough for accommodating said lower end of said lever, and wherein said lower end of said lever comprises a pin receiving hole, and including a pin through said hole for maintaining said float on said lever.

8. An assembly according to claim 6 wherein said lever is provided with an opening in which said resilient member is secured.

9. An assembly according to claim 6 wherein said housing is cast aluminum.

10. A non-siphoning float controlled valve assembly for attachment to a tank to control the supply of liquid from a source to the tank, to regulate the level of the liquid in the tank, and to prevent back-siphoning of liquid from the tank into the liquid supply source comprising:

a one-piece hollow cast aluminum housing having an integrally formed upwardly extending hollow neck near one end thereof, said housing being open at the bottom and defining a float chamber and said neck defining a fill passage;

an upper wall integral with said neck and extending across said fill passage, said upper wall having an opening extending therethrough;

threaded connection means integral with said neck and disposed above said upper wall for connecting said assembly to said supply of liquid;

a hollow member extending through said opening and having a liquid fill inlet opening therethrough for communicating between said liquid supply source and said fill passage;

a valve seat at the lower end of said hollow member and surrounding said liquid fill inlet opening;

at least one anti-siphon hole extending through said neck below said liquid fill inlet opening;

a float support lever having an upper end and a lower end and extending between said fill passage and said float chamber, at least one pivot pin hole through said lever near said upper end thereof and a pin receiving hole near said lower end of said lever, means for pivotally connecting said upper end of said lever to said neck in said fill passage, said means comprising a pair of pivot pin holes extending through said neck and a pin extending through said pivot pin holes in said neck and in said lever;

a float disposed in said float chamber and connected to said lower end of said float lever, said float comprising an opening extending therethrough for accommodating said lower end of said lever;

a pin through said pin receiving hole for maintaining said float on said lever; and a resilient member secured in a hole in said support lever for cooperating with said valve seat to open and close said liquid fill inlet opening in response to pivotal movement of said float support lever and said float.

* * * * *